United States Patent
Lee

(10) Patent No.: US 11,314,638 B2
(45) Date of Patent: Apr. 26, 2022

(54) DATA STORAGE DEVICE, OPERATING METHOD THEREOF AND STORAGE SYSTEM USING THE SAME

(71) Applicant: SK hynix Inc., Gyeonggi-do (KR)

(72) Inventor: Seok Jun Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/884,683

(22) Filed: May 27, 2020

(65) Prior Publication Data

US 2021/0191857 A1 Jun. 24, 2021

(30) Foreign Application Priority Data

Dec. 20, 2019 (KR) .......................... 10-2019-0172123

(51) Int. Cl.
*G06F 12/02* (2006.01)
*G06F 12/10* (2016.01)
*G06F 12/06* (2006.01)

(52) U.S. Cl.
CPC ...... *G06F 12/0253* (2013.01); *G06F 12/0607* (2013.01); *G06F 12/10* (2013.01); *G06F 2212/1024* (2013.01)

(58) Field of Classification Search
CPC ... G06F 12/10; G06F 12/0607; G06F 12/0253
See application file for complete search history.

(56) References Cited

U.S. PATENT DOCUMENTS

| | | | | |
|---|---|---|---|---|
| 2010/0057979 A1* | 3/2010 | Chu | ...................... | G06F 12/0246 711/103 |
| 2013/0275657 A1* | 10/2013 | Kim | ...................... | G06F 12/0246 711/103 |
| 2016/0202910 A1* | 7/2016 | Ravimohan | .......... | G06F 12/0607 711/103 |
| 2016/0232091 A1* | 8/2016 | Wang | .................. | G06F 12/0851 |
| 2017/0199703 A1* | 7/2017 | Ravimohan | ........... | G06F 3/0659 |
| 2017/0344262 A1* | 11/2017 | Kim | ....................... | G06F 3/0658 |
| 2019/0114101 A1* | 4/2019 | Kim | ....................... | G06F 3/0629 |

FOREIGN PATENT DOCUMENTS

| | | |
|---|---|---|
| KR | 10-2014-0040998 | 4/2014 |
| KR | 10-2019-0041082 | 4/2019 |

OTHER PUBLICATIONS

S. Baeg, S. Wen and R. Wong, "SRAM Interleaving Distance Selection With a Soft Error Failure Model," in IEEE Transactions on Nuclear Science, vol. 56, No. 4, pp. 2111-2118, Aug. 2009.*
T. Richter and G. P. Fettweis, "Parallel interleaving on parallel DSP architectures," IEEE Workshop on Signal Processing Systems, 2002, pp. 195-200.*

* cited by examiner

*Primary Examiner* — Pierre Miche Bataille
(74) *Attorney, Agent, or Firm* — IP & T Group LLP

(57) ABSTRACT

A data storage device includes a nonvolatile memory device including a plurality of memory groups, each of which includes a plurality of memory regions in interleaving units and a controller configured to determine and manage interleaving-aware dirty (IAD) of a write-requested logical address whenever write-requested data is written in the nonvolatile memory device, and select a victim memory group among the plurality of memory groups using the interleaving-aware dirty.

18 Claims, 9 Drawing Sheets

| MEMORY GROUP | MEMORY REGION | # of interleavable logical addresses | IAD | IAD AVERAGE | AVERAGE OF TOTAL IAD |
|---|---|---|---|---|---|
| MEMORY GROUP 0 | MEMORY 0 | 4 | IAD = 100 | 75 | x |
| | MEMORY 1 | 2 | IAD = 50 | | |
| MEMORY GROUP 1 | MEMORY 0 | 2 | IAD = 50 | 52 | |
| | MEMORY 1 | 2 | IAD = 50 | | |
| ... | ... | ... | ... | ... | |

*IN: INTERLEAVABLE NUMBER

FIG.5

| MEMORY GROUP | MEMORY REGION | # of interleavable logical addresses | IAD | IAD AVERAGE | AVERAGE OF TOTAL IAD |
|---|---|---|---|---|---|
| MEMORY GROUP 0 | MEMORY 0 | 4 | IAD = 100 | 75 | x |
| | MEMORY 1 | 2 | IAD = 50 | | |
| MEMORY GROUP 1 | MEMORY 0 | 2 | IAD = 50 | 52 | |
| | MEMORY 1 | 2 | IAD = 50 | | |
| ... | ... | ... | ... | ... | |

DATA STORAGE DEVICE, OPERATING METHOD THEREOF AND STORAGE SYSTEM USING THE SAME

CROSS-REFERENCE TO RELATED APPLICATION

The present application claims priority under 35 U.S.C. § 119(a) to Korean application number 10-2019-0172123, filed on Dec. 20, 2019, in the Korean Intellectual Property Office, which is incorporated herein by reference in its entirety.

BACKGROUND

1. Technical Field

Various embodiments generally relate to a semiconductor device, and more particularly, to a data storage device and an operating method thereof.

2. Related Art

Data storage devices using semiconductor memory devices have no mechanical driving units, exhibit good stability and endurance, as well as have a fast information access rate and low power consumption. Such data storage devices may include a universal serial bus (USB) memory device, a memory card having various interfaces, a universal flash storage (UFS) device, a solid state drive (SSD), and the like.

Memory interleaving techniques are used to improve read performance of memory devices. However, as overwrite and garbage collection are repeatedly performed, physical positions of logical block addresses (LBAs) may not be sequentially arranged and instead may be scattered sporadically. Thus, it may be difficult or impossible to perform interleaving, in which case read performance may be degraded.

SUMMARY

Embodiments are provided to a data storage device capable of improving read performance by quickly determining the interleaving-aware dirty of logical block addresses and an operating method thereof.

In an embodiment of the present disclosure, a data storage device may include: a nonvolatile memory device including a plurality of memory groups, each of which includes a plurality of memory regions in interleaving units; and a controller configured to: determine and manage interleavability of a write-requested logical address of write-requested data whenever the write-requested data is written in the nonvolatile memory device, select a victim memory group among the plurality of memory groups using the interleavability, and perform garbage collection on the selected victim memory group.

In an embodiment of the present disclosure, an operating method of a data storage device, the method may include: determining and managing interleavability of a write-requested logical address of write-requested data whenever the write-requested data is written in a nonvolatile memory device; selecting a victim memory group among a plurality of memory groups, each of which includes a plurality of memory regions in interleaving units, using the interleavability when a garbage collection condition is satisfied; and performing garbage collection on the selected victim memory group.

In an embodiment of the present disclosure, a data storage device may include: a nonvolatile memory device including a plurality of memory groups, each of which includes a plurality of memory regions in interleaving units; and a controller configured to: generate and manage interleavability of each of the plurality of memory regions by determining whether or not a current physical address corresponding to the write-requested logical address is included in an optimal memory region whenever the write-requested data is written in the nonvolatile memory device, select a victim memory group among the plurality of memory groups based on the interleavability, and perform garbage collection on the selected victim memory group, wherein the controller determines the optimal memory region for the logical address using the logical address of the write-requested data, the number of logical addresses in one memory region applied in interleaving, and the number of memory regions in a memory group applied in the interleaving.

In an embodiment of the present disclosure, a data storage device may include: a memory device including memory groups each having memory regions, each memory group being target unit of a single interleaving operation; and a controller configured to: control the memory device to store write-requested data in any among the memory regions, measuring feasibility of the interleaving operation on the respective memory groups based on a write-requested logical address, a number of pieces of write-requested data that can be stored in an interleaving scheme in a single memory region and a number of memory regions within a single memory group, and control the memory device to perform a garbage collection operation on a victim memory group selected from the memory groups based on the feasibility.

According to an embodiment of the present disclosure, the data storage device may determine and manage whether a current physical address for a logical address of write-requested data is included in an interleavable optimal memory region and select a victim memory group based on the determination result. Garbage collection may be controlled to be aggressively performed on the victim memory group and thus the read performance may be improved.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIG. 5 is a diagram illustrating a table indicating ability of memory regions to perform interleaving according to an embodiment of the present disclosure;

DETAILED DESCRIPTION

Various embodiments of the present invention are described in greater detail below with reference to the accompanying drawings. However, features and aspects of the present invention may be configured or arranged differently than disclosed herein. Thus, the present invention is not limited to the disclosed embodiments. Rather, the present invention encompasses all modifications and variations of any of the disclosed embodiments that fall within the scope of the claims. Also, throughout the specification, reference to "an embodiment," "another embodiment" or the like is not necessarily to only one embodiment, and different references to any such phrase are not necessarily to the same embodiment(s).

It will be understood that when an element or layer is referred to as being "on," "connected to" or "coupled with" another element or layer, it can be directly on, connected or coupled with the other element or layer or one or more intervening elements or layers may be present. It will be further understood that the terms "comprises" and/or "comprising," when used in this specification, do not preclude the existence or addition of other non-stated elements. Similarly, the indefinite articles "a" and "an" indicate one or more, unless stated or the context clearly indicates only one.

Figure 1:
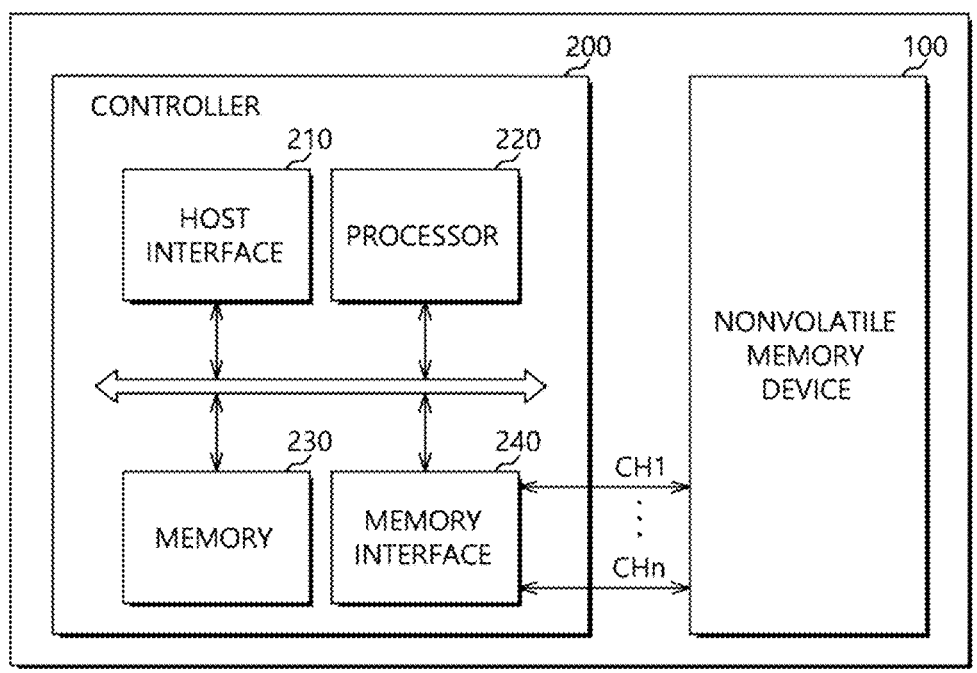
FIG. 1 is a diagram illustrating a configuration of a data storage device according to an embodiment of the present disclosure.

FIG. 1 is a diagram illustrating a configuration of a data storage device according to an embodiment.

Figure 2:
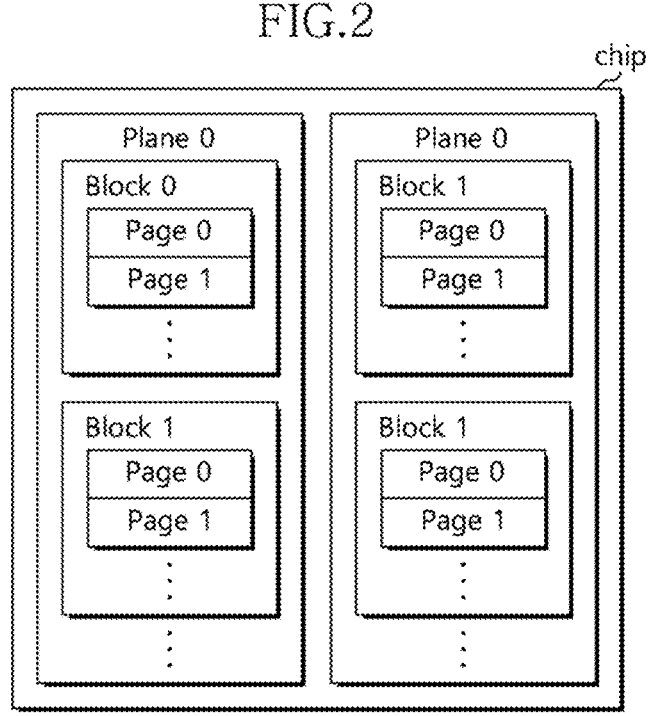
FIG. 2 is a diagram illustrating a configuration of a NAND flash memory according to an embodiment of the present disclosure.
Figure 3:
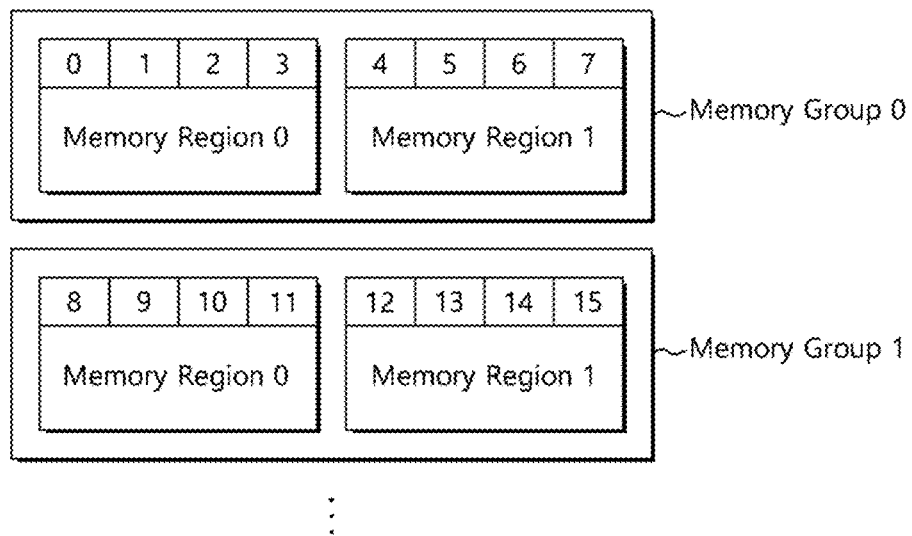
FIG. 3 is a diagram illustrating an optimal memory region for a logical address according to an embodiment of the present disclosure.
Figure 4:
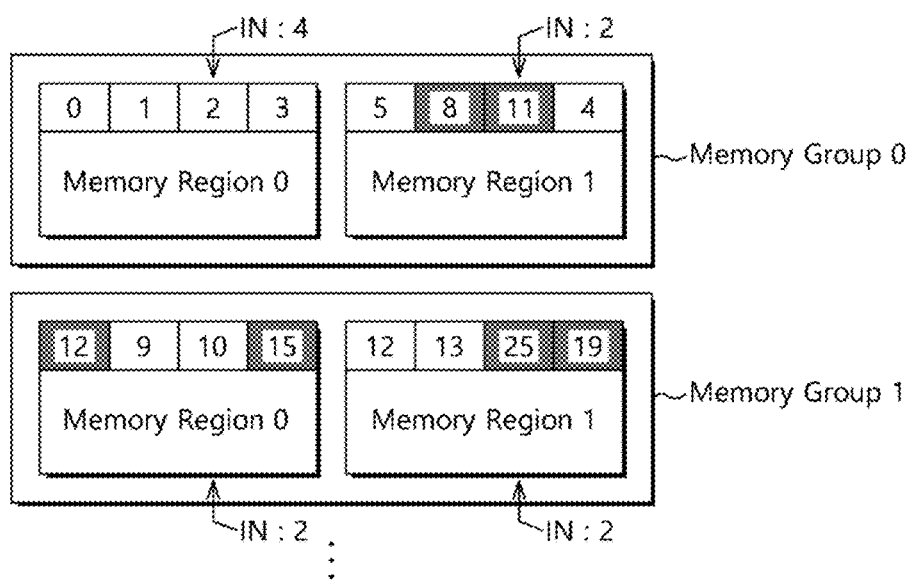
FIG. 4 is a diagram illustrating a current memory region for a logical address according to an embodiment of the present disclosure.

FIG. 2 is a diagram illustrating a configuration of a NAND flash memory according to an embodiment, FIG. 3 is a diagram illustrating an optimal memory region for a logical address according to an embodiment, FIG. 4 is a diagram illustrating a current memory region for a logical address according to an embodiment, and FIG. 5 is a diagram illustrating a table indicating interleavability of memory regions according to an embodiment. Hereinafter, a data storage device will be described with reference to FIGS. 1 to 5.

Referring to FIG. 1, a data storage device 10 according to an embodiment may store data to be accessed by a host device (not shown) such as a mobile phone, an MP3 player, a laptop computer, a desktop computer, a game player, a television (TV), an in-vehicle infotainment system, and the like. The data storage device 10 may refer to a memory system.

The data storage device 10 may be configured as any of various types of storage devices according to an interface protocol coupled to the host device. For example, the data storage device 10 may be configured as a solid state drive (SSD), a multimedia card in the form of MMC, eMMC, RS-MMC, and micro-MMC, a secure digital card in the form of SD, mini-SD, and micro-SD, a universal serial bus (USB) storage device, a universal flash storage (UFS) device, a personal computer memory card international association (PCMCIA) card type storage device, a peripheral component interconnection (PCI) card type storage device, a PCI Express (PCI-E) card type storage device, a compact flash (CF) card, a smart media card, and/or a memory stick.

The data storage device 10 may be manufactured as any of various types of packages. For example, the data storage device 10 may be manufactured as a package on package (POP), a system in package (SIP), a system on chip (SOC), a multi-chip package (MCP), a chip on board (COB), a wafer-level fabricated package (WFP), and/or a wafer-level stack package (WSP).

Referring to FIG. 1, the data storage device 10 may include a nonvolatile memory device 100 and a controller 200.

The nonvolatile memory device 100 may include a plurality of memory groups, each of which includes a plurality of memory regions in interleaving units.

As illustrated in FIG. 2, when the nonvolatile memory device 100 is an NAND flash memory device, the nonvolatile memory device 100 may have a structure in which each of a plurality of planes (for example, Plane 0, Plane 1, and the like) includes a plurality of blocks (for example, Block 0, Block 1, and the like) and each of the plurality of blocks includes a plurality of pages (for example, Page 0, Page 1, and the like). A write or read operation may be performed on the NAND flash memory in page units (for example, Page 0 or Page 1 may be a page unit) and an erase operation may be performed on the NAND flash memory in block size units. In this disclosure, a memory region may be a plane or a block.

A single memory group may be a target unit of a single interleaving operation and may include a plurality of memory regions (i.e., a plurality of planes or a plurality of blocks).

The nonvolatile memory device 100 may be operated as a storage medium of the data storage device 10. The nonvolatile memory device 100 may include any of various types of nonvolatile memory devices according to the type of memory cells therein, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and a resistive random access memory (ReRAM) using a transition metal compound.

The nonvolatile memory device 100, which is described in detail with reference to FIG. 13, may include a memory cell array 110 including a plurality of memory cells MC arranged in regions in which a plurality of word lines WL1 to WLm and a plurality of bit lines BL1 to BLn intersect. For example, each of the memory cells in the memory cell array 110 may be operated as a single-level cell (SLC) in which a single bit data (for example, 1-bit data) is to be stored, a multi-level cell (MLC) in which 2-bit data is to be stored, a triple-level cell (TLC) in which 3-bit data is to be stored, or a quad-level cell (QLC) in which 4-bit data is to be stored. The memory cell array 110 may include at least one of these types of memory cells. The memory cell array 110 may include memory cells arranged in a two-dimensional (2D) horizontal structure or memory cells arranged in a 3D vertical structure.

A controller 200 may determine and manage interleavability of a logical address of write-requested data (a write-requested logical address) whenever the write-requested data is written in the nonvolatile memory device 100. In this disclosure, the term "interleavability" indicates suitability to participate in an interleaving operation or an interleaving scheme. In this disclosure, the interleavability of the write-requested logical address may indicate whether or not the write-requested data is stored in a physical storage location corresponding to the write-requested logical address within an optimal memory region for the write-requested data. In this disclosure, interleavability of a memory region may indicate whether or not the memory region can store the write-requested data through the interleaving scheme or through the interleaving operation. In this disclosure, the physical storage location may be a page within a memory region.

The controller 200 may determine whether or not the write-requested logical address is suitable for an interleaving operation (i.e., whether or not the write-requested logical address is interleavable) based on whether a physical address corresponding to the write-requested logical address is included in an optimal memory region for the write-requested data. In this disclosure, "interleavable" may be construed as suitable for an interleaving operation. The optimal memory region for the write-requested data may be an ideal memory region suitable for storing the write-requested data through the interleaving operation or through the interleaving scheme. When the write-requested data is stored in the optimal memory region therefore, the write-requested logical address may be regarded as interleavable. When the write-requested data is stored in another memory region other than the optimal memory region therefore, the write-requested logical address may not be regarded as interleavable. The optimal memory region for the write-requested data may be expressed as Equation 1, which will be described below.

Through such a method, the controller 200 may determine the interleavability of the memory region based on the number of the interleavable logical addresses corresponding to the memory region. The logical address of the data may be arranged in the interleavable memory region.

The controller 200 may select a victim memory group among the plurality of memory groups using the interleavability of the memory regions and perform garbage collection on the victim memory group. Details of such operations are provided below.

Referring to FIG. 1, the controller 200 may include a host interface 210, a processor 220, a memory 230, and a memory interface 240.

The controller 200 may control overall operation of the data storage device 10 through driving of firmware or software loaded into the memory 230. The controller 200 may decode and drive a code-type instruction or algorithm such as firmware or software. The controller 200 may be implemented with hardware or a combination of hardware and software.

Although not shown in FIG. 1, the controller 200 may further include an error correction code (ECC) engine which generates a parity by ECC encoding write data provided from the host device and ECC decodes read data read out from the nonvolatile memory device 100 using the parity. The ECC engine may be provided in the inside or outside of the memory interface 240.

The host interface 210 may perform interfacing between the host device and the data storage device 10 according to a protocol of the host device. For example, the host interface 210 may communicate with the host device through any of a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and/or a PCI-E protocol.

The processor 220 may generate and manage interleavability of each of the plurality of memory regions by determining whether or not a current physical address corresponding to the write-requested logical address is included in an optimal memory region whenever the write-requested data is written in the nonvolatile memory device 100. Then, the processor 220 may select a victim memory group among the plurality of memory groups based on the interleavability of the memory regions. For example, the processor 220 may determine whether or not the write-requested logical address is interleavable by determining whether or not the current physical storage location corresponding to the write-requested logical address is included in the physical storage location within the optimal memory region. The physical address may be matched with information for a memory group and a memory region, and other information including offset information. The processor 220 may determine the memory group and the memory region matched with the physical address through the physical address. The processor 220 may determine whether or not the write-requested logical address is interleavable by determining whether or not the physical address of the write-requested data is within the optimal memory region.

The processor 220 may determine the optimal memory region for write-requested data using the write-requested logical address, a number of logical addresses in one memory region applied in interleaving, and a number of memory regions that can be involved through the interleaving scheme in a memory group. The number of memory regions that can be involved through the interleaving scheme in a memory group may be a number of memory regions to store the write-requested data through the interleaving scheme in the memory group. Then, the processor 220 may determine the interleavability of each of the memory regions by determining the number of interleavable logical addresses based on whether the current physical address corresponding to the write-requested logical address is included in the optimal memory region.

Referring to FIG. 3, the nonvolatile memory device 100 may write, in page units, write-requested data of logical addresses LBA 0, LBA 1, LBA 2, and LBA 3 in Memory Region 0 of Memory group 0 and write-requested data of logical addresses LBA 4, LBA 5, LBA 6, and LBA 7 in Memory Region 1 of Memory group 0, in a sequential manner. Further, the nonvolatile memory device 100 may write, in page units, write-requested data of logical addresses LBA 8, LBA 9, LBA 10, and LBA 11 in Memory Region 0 of Memory Group 1 and write-requested data of logical addresses LBA 12, LBA 13, LBA 14, and LBA 15 in Memory Region 1 of Memory Group 1, in a sequential manner. FIG. 3 exemplifies that all write-requested data are stored in the respective optimal memory regions. Then, as overwrite and garbage collection are repeatedly performed on the nonvolatile memory device 100 according to a write command of the host device, the physical address corresponding to the write-requested logical addresses may be rearranged to a non-sequential state as illustrated in FIG. 4. FIGS. 3 and 4 illustrate the physical addresses indicated by respective write-requested logical addresses.

Referring to FIG. 4, the processor 220 may configure one memory group, i.e., Memory Group 0, by grouping a plurality of memory regions, for example, Memory Region 0 and Memory Region 1. Through repetition of such process, the processor 220 may configure a plurality of memory groups, e.g., Memory Group 0 and Memory Group 1, each of which includes a plurality of memory regions, e.g., Memory Region 0 and Memory Region 1, as illustrated in FIGS. 3 and 4.

Referring to FIGS. 3 and 4, the processor 220 may determine whether or not a physical address corresponding to a write-requested logical address is included in an optimal memory region whenever the write-requested data is written.

For example, the write-requested logical address LBA 0 in FIG. 4 may be counted as an interleavable logical address since a current physical address corresponding to the write-requested logical address LBA 0 is included in the optimal memory region Memory Region 0 of Memory Group 0. The write-requested logical address LBA 8 in FIG. 4 may not be counted as an interleavable logical address since a current physical address corresponding to the write-requested logical address LBA 8 is included not in the optimal memory region Memory Region 0 of Memory Group 1 but in Memory Region 1 of Memory group 0. Through such a method, the processor 220 may determine the number of interleavable logical addresses for each of Memory Regions 0 and 1. In the embodiment, it may be determined whether the write-requested logical address is interleavable based on whether the physical address corresponding to the write-requested logical address is included in the optimal memory region. This determination method may be different from the method for determining whether or not an initial physical address or a previous physical address is the same as the current physical address. For example, in an embodiment, even though the physical address corresponding to the write-requested logical address is changed, the write-requested logical address may be counted as an interleavable logical address when the physical address corresponding to the write-requested logical address is included in the optimal memory region.

Specifically, the processor 220 may determine the optimal memory region for the write-requested data based on the following Equation 1.

The processor 220 may count write-requested logical address as an interleavable logical address when a current physical address corresponding to the write-requested logical address is included in the optimal memory region calculated through Equation 1 and may not count the write-requested logical address as an interleavable logical address when the current physical address is not included in the optimal memory region.

An optimal memory region for write-requested data=(a write-requested logical address/a number of LBAs in one memory region applied in interleaving) mod (a number of memory regions in one memory group applied in interleaving)  [Equation 1]

In Equation 1, the operator "mod" denotes the modulo operation. In the embodiment, the optimal memory region may refer to an interleavable memory region, for example, a plane or a block. As defined above, the optimal memory region for the write-requested data may be an ideal memory region suitable for storing the write-requested data through the interleaving operation or through the interleaving scheme. When the write-requested data is stored in the optimal memory region, the write-requested logical address may be regarded as interleavable. When the write-requested data is stored in another memory region, i.e., other than the optimal memory region, the write-requested logical address may not be regarded as interleavable. Even though positions of current physical addresses corresponding to the logical addresses LBA 4 and LBA 5 of FIG. 4 are changed differently from FIG. 3, the write-requested logical addresses LBA 4 and LBA 5 may be still counted as interleavable logical addresses since the current physical addresses of the write-requested data are still included in the optimal memory region, i.e., Memory Region 1.

For example, in FIG. 4, the number logical addresses LBAs in one memory region applied in interleaving may be 4, for example, in the memory region Memory Region 0. The number of memory regions that can be involved through the interleaving scheme in the memory group Memory Group 0 may be 2 of the memory regions Memory Region 0 and Memory Region 1.

For example, the processor 220 may count the write-requested logical address LBA 2 as an interleavable logical address by determining that a current physical address corresponding to the write-requested logical address LBA 2 is included in the optimal memory region Memory Region 0 from a calculation result of Equation 1 for the optimal memory region for the write-requested data of the logical address LBA2 (i.e., (2/4) mod 2=0).

The processor 220 may determine the interleavability of Memory Regions 0 and 1 for each of Memory Groups 0 and 1 based on the number of interleavable logical addresses counted for each of these memory regions in the respective memory groups as illustrated in FIG. 5.

For example, referring to FIG. 5, the processor 220 may derive the interleaving-aware dirty (IAD) for the memory region Memory Region 0 in the memory group Memory Group 0 of FIG. 4 as IAD 100 from the condition that the interleavable logical address is 4 among 4 logical addresses and derive the interleaving-aware dirty (IAD) for the memory region Memory Region 1 in the memory group Memory Group 0 of FIG. 4 as IAD 50 from the condition that the interleavable logical address is 2 among 4 logical addresses. Through the above-described method, the processor 220 may derive the interleavability (IAD) of each of the memory regions of the respective memory groups.

The processor 220 may calculates an average interleavability of each of the plurality of memory regions in each memory group and select a victim memory group among the memory groups based on the calculated averages. The processor 220 may select a memory group having the lowest average interleavability of each of the plurality of memory regions as the victim memory group among the memory groups, but the invention is not limited thereto.

Referring to FIG. 5, the processor 220 may select Memory Group 1 as the victim memory group since the average interleavability of Memory Group 0 is 75 and the average interleavability of Memory Group 1 is 50 in an example in which the plurality of memory groups includes only these two memory groups.

In another example, the processor 220 may perform an operation of comparing an average (see "x" of FIG. 5) of interleavability of all (total) memory groups and a threshold value before selecting the victim memory group. The processor 220 may perform an operation of sufficiently ensuring enough time for performing garbage collection when the average interleavability of all memory groups is less than the threshold value as a comparison result between the average and the threshold value.

For example, the processor 220 may calculate the average interleavability of each of the plurality of memory groups and the average of interleavability of all memory groups and select the victim memory group among the plurality of memory groups based on the average interleavability of each of the plurality of memory groups when the calculated average interleavability of all memory groups are equal to or larger than the threshold value.

The processor 220 may select the memory group (e.g., Memory Group 1) having the smallest average interleavability of each of the plurality of memory groups, e.g., Memory Group 0 and Memory Group 1, as the victim memory group, but the invention is not limited thereto.

The processor 220 may transmit a request for maintaining power for garbage collection to the host device when the calculated average interleavability of all memory groups is less than the threshold value, and select the victim memory group (e.g., Memory Group 1) among the plurality of memory groups (e.g., Memory Groups 0 and 1) based on the average interleavability of each of the plurality of memory groups when acceptance of the request is received from the host device. The processor 220 may select the memory group (e.g., Memory Group 1) having the smallest average interleavability of each of the plurality of memory groups (e.g., Memory Groups 0 and 1) as the victim memory group, but the invention is not limited thereto.

The time during which power is maintained by the host device may refer to the time required to perform garbage collection, and may be set according to considerations such as system design and intended use.

After selecting the victim memory group and performing garbage collection with the victim memory group, the processor 220 may perform the operations of selecting the victim memory group and performing garbage collection repeatedly when more time for supplying power for garbage collection still remains and the remaining amount of time is equal to or larger than a time required to perform additional garbage collection.

The processor 220 may select the victim memory group when a garbage collection command is received from the host device or a duration that the garbage collection command is not received from the host device is equal to or larger than a set time. For example, the processor 220 may select the victim memory group when the garbage collection command is received from the host device or the garbage collection command is not received from the host device for the set time or more. As described above, the victim memory group may be selected based on the average interleavability of each of the plurality of memory groups or the average interleavability of the total memory groups.

For example, when a background garbage collection is possible since the device is in an idle state in which the command is not transmitted from the host device for the set time or more or in a sleep state while charging, the processor 220 may select the victim memory group under either of these conditions.

The processor 220 may determine whether or not a physical address corresponding to the write-requested logical address is included in the optimal memory region whenever writing or updating the write-requested data in the nonvolatile memory device 100 or performing garbage collection on the data stored in the nonvolatile memory device 100.

The processor 220 may be configured as a micro control unit (MCU) and/or a central processing unit (CPU). The processor 220 may process requests transmitted from the host device. To process requests transmitted from the host device, the processor 220 may drive a code-type instruction or algorithm (for example, firmware) loaded into the memory 230 and control internal function blocks such as the host interface 210, the memory 230, and the memory interface 240 and the nonvolatile memory device 100.

The processor 220 may generate control signals for controlling operations of the nonvolatile memory device 100 based on the requests transmitted from the host device and provide the generated control signals to the nonvolatile memory device 100 through the memory interface 240.

The memory 230 may store the interleavability of the memory regions in a table form.

The memory 230 may be configured as a dynamic random access memory (DRAM) or a static random access memory (SRAM). The memory 230 may store the firmware driven through the processor 220. The memory 230 may also store data (for example, metadata) for driving the firmware. For example, the memory 230 may be operated as a working memory of the processor 220. Although not shown in FIG. 1, the controller 200 may further include a processor dedicated memory arranged for ready access by the processor 220, and the firmware and metadata stored in the memory 230 may be loaded into the processor dedicated memory.

The memory 230 may be configured to include a data buffer configured to temporarily store write data to be transmitted to the nonvolatile memory device 100 from the host device or read data to be transmitted to the host device from the nonvolatile memory device 100. For example, the memory 230 may be operated as a buffer memory of the processor 220.

It has been illustrated in FIG. 1 that the memory 230 is provided within the controller 200, but in another embodiment the memory 230 may be provided as a separate component disposed externally to the controller 200.

The memory interface 240 may control the nonvolatile memory device 100 according to control of the processor 220. When the nonvolatile memory device 100 is configured as a NAND flash memory, the memory interface 240 may refer to a flash control top (FCT). The memory interface 240 may transmit control signals generated through the processor 220 to the nonvolatile memory device 100. The control signals may include a command, an address, an operation control signal, and the like for controlling the operations of the nonvolatile memory device 100. The operation control signal may include, for example, a chip enable signal, a command latch enable signal, an address latch enable signal, a write enable signal, a read enable signal, a data strobe signal, and the like, but this is not limited thereto. The memory interface 240 may transmit write data to the nonvolatile memory device 100 or receive read data from the nonvolatile memory device 100.

The memory interface 240 and the nonvolatile memory device 100 may be coupled through a plurality of channels CH1 to CHn, respectively. The memory interface 240 may transmit signals such as a command, an address, an operation control signal, and data (for example, write data) to the nonvolatile memory device 100 through the plurality of channels CH1 to CHn. The memory interface 240 may receive a status signal (for example, ready/busy), data (for example, read data) and the like from the nonvolatile memory device 100 through the plurality of channels CH1 to CHn.

Figure 6:
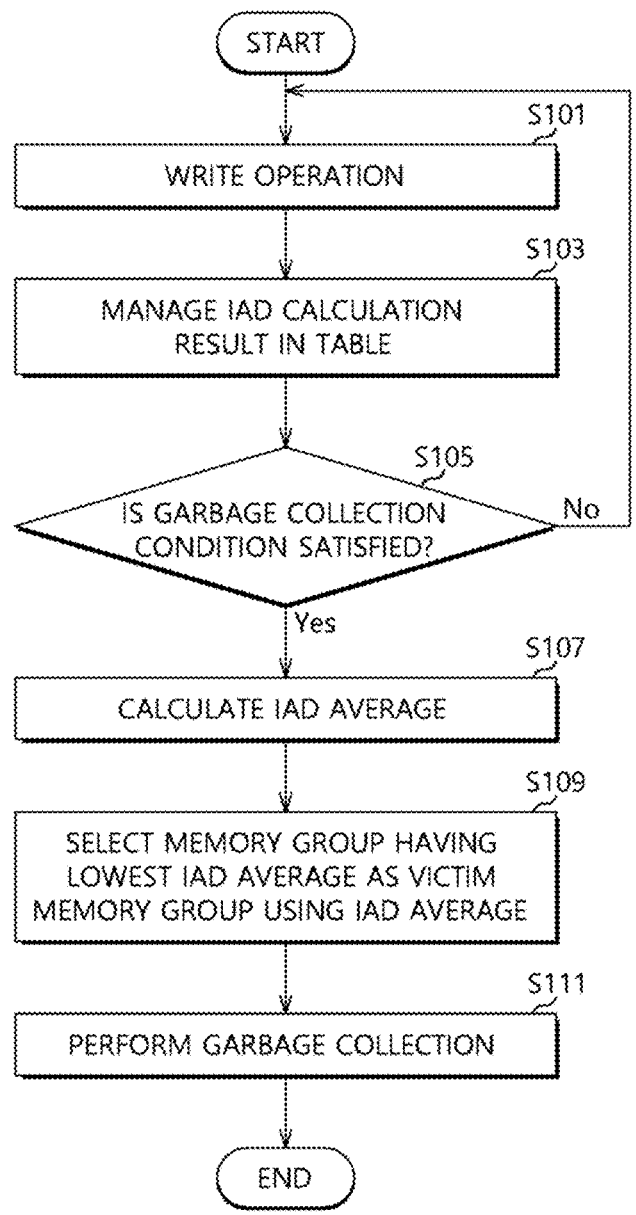
FIG. 6 is a flowchart explaining an operating method of a data storage device according to an embodiment of the present disclosure.

FIG. 6 is a flowchart explaining an operating method of a data storage device according to an embodiment.

The controller 200 may receive a write request of data transmitted from a host device (S101).

The controller 200 may determine and manage interleavability of a write-requested logical address when the write-requested data is written in the nonvolatile memory device 100 (S103).

The controller 200 may generate interleavability of each of the memory regions by determining whether or not a current physical address corresponding to the write-requested logical addresses is included in an optimal memory region.

The physical address may be matched with information for a memory group and a memory region, and other information including offset information. The processor 220 may determine the memory group and the memory region matched with the physical address through the physical address. The controller 200 may determine whether or not the write-requested logical address is interleavable by determining whether or not the physical address of the write-requested data is within the optimal memory region. The memory group may be a group of units to be interleavable at once and may include a plurality of planes Plane or a plurality of blocks Block.

The controller 200 may determine whether or not the physical address corresponding to the write-requested logical addresses is included in the optimal memory region whenever writing or updating the write-requested data in the nonvolatile memory device 100 or performing garbage collection on the data stored in the nonvolatile memory device 100.

As described with reference to Equation 1, the controller 200 may determine the optimal memory region for the write-requested data using the write-requested logical address, the number of pieces of write-requested data that can be stored through an interleaving scheme in one memory region, and the number of memory regions that can be involved in the interleaving scheme in a memory group. Then, the controller 200 may determine the interleavability of each of the memory regions by determining the number of interleavable logical addresses in each of the memory regions based on whether the current physical address corresponding to the write-requested logical address is included in the optimal memory region. The number of logical addresses in the one memory region applied in interleaving may refer to the number of logical addresses corresponding to a data size stored in memory cells coupled to one word line in the one memory region.

Referring to FIGS. 3 and 4, the controller 200 may determine whether or not the physical address corresponding to the write-requested logical address is included in the optimal memory region whenever the write-requested data is written. The optimal memory region may refer to a position in which the data corresponding to the write-requested logical address is to be interleavable.

For example, the write-requested logical address LBA 0 in FIG. 4 may be counted as an interleavable logical address since a current physical address corresponding to the write-requested logical address LBA 0 is included in the optimal memory region, e.g., Memory Region 0 of Memory Group 0. The write-requested logical address LBA 8 in FIG. 4 may not be counted as an interleavable logical address since a current physical address corresponding to the write-requested logical address LBA 8 is included not in the optimal memory region, e.g., Memory Region 0 of Memory Group 1, but in Memory Region 1 of Memory group 0. Through such a method, the controller 200 may determine the number of interleavable logical addresses for each of the memory regions.

The controller 200 may determine the optimal memory region for the write-requested data based on Equation 1.

The controller 200 may count the write-requested logical address as an interleavable logical address when a current physical address corresponding to the write-requested logical address is included in the optimal memory region calculated through Equation 1 and may not count the write-requested logical address as an interleavable logical address when the current physical address is not included in the optimal memory region.

For example, the controller 200 may count the write-requested logical address LBA 2 as an interleavable logical address by determining that a current physical address corresponding to the write-requested logical address LBA 2 is included in the optimal memory region, e.g., Memory Region 0, from a calculation result of Equation 1 for the optimal memory region for the write-requested data of LBA2 (i.e., (2/4) mod 2=0).

The controller 200 may determine the interleavability of the respective memory regions based on the number of interleavable logical addresses counted for each of the memory regions in the respective memory groups as illustrated in FIG. 5.

For example, referring to FIG. 5, the controller 200 may derive the interleaving-aware dirty (IAD) for the memory region Memory Region 0 in the memory group Memory Group 0 of FIG. 4 as IAD 100 from the condition that the interleavable logical address is 4 among 4 logical addresses and derive the interleaving-aware dirty (IAD) for the memory region Memory Region 1 in the memory group Memory Group 0 of FIG. 4 as IAD 50 from the condition that the interleavable logical address is 2 among 4 logical addresses. Through the above-described method, the controller 200 may derive the interleaving-aware dirty (IAD) for each of the memory regions with respect to total memory groups.

The controller 200 may determine whether or not a garbage collection condition is satisfied (S105). When the garbage collection condition is satisfied, the controller 200 may determine that a victim memory group for garbage collection needs to be selected.

The controller 200 may determine that the garbage collection condition is satisfied when the garbage collection command is received from the host device or the garbage collection command has not been received from the host device for the set time or more.

When it is determined that the garbage collection condition is satisfied, the controller 200 may select a victim memory group among the plurality of memory groups using the interleavability of the memory regions.

For example, the controller 200 may calculate an average interleavability of each of the plurality of memory groups, e.g., Memory Group 0 and Memory Group 1 (S107).

The controller 200 may select the victim memory group among the plurality of memory groups based on the calculated average interleavability of the memory groups (S109).

The controller 200 may select the memory group (e.g., Memory Group 1) having the lowest average interleavability as the victim memory group, but the invention is not limited thereto.

The controller 200 may control the garbage collection to be performed on the victim memory group (S111).

Figure 7:
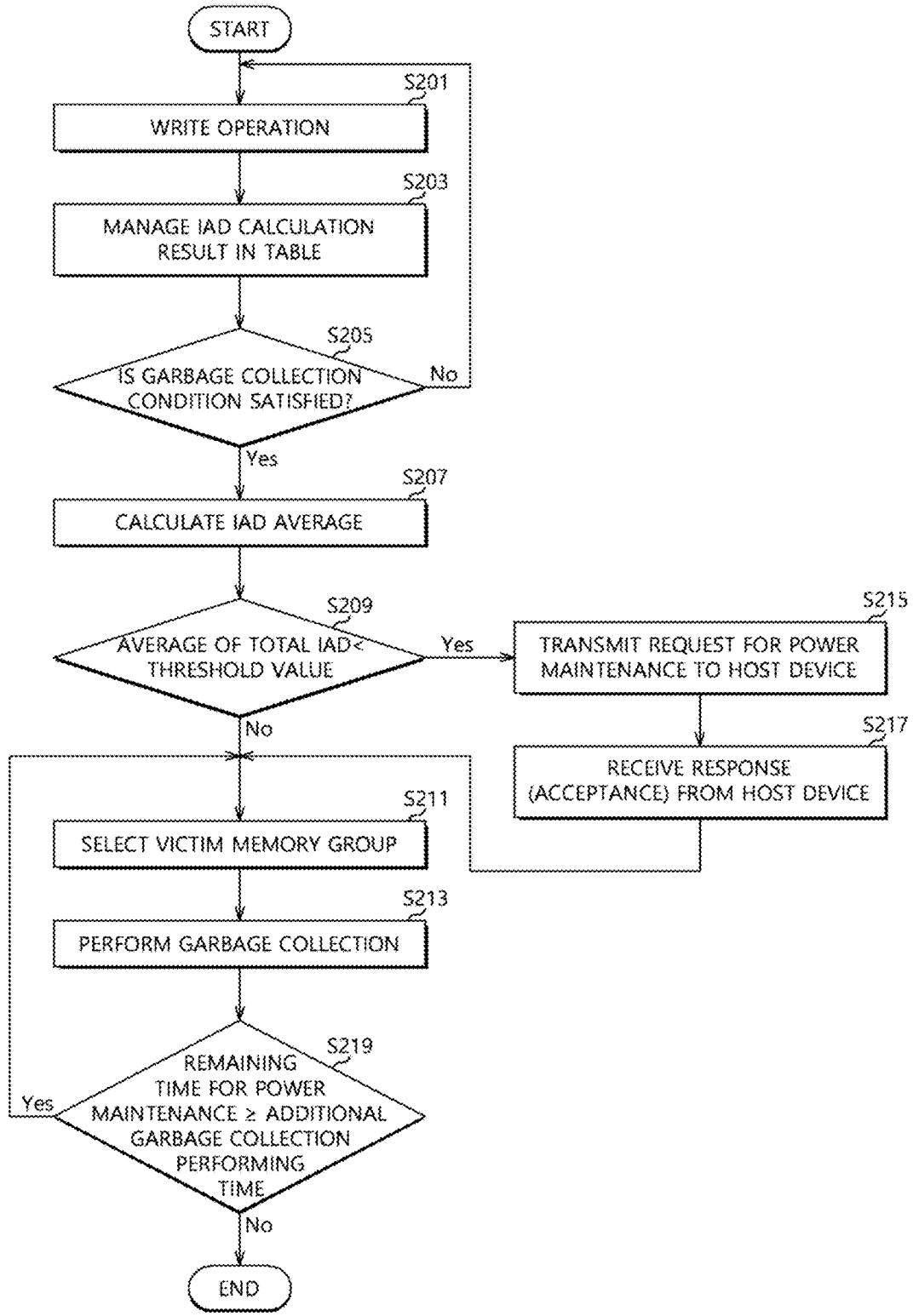
FIG. 7 is a flowchart explaining an operating method of a data storage device according to another embodiment of the present disclosure.

FIG. 7 is a flowchart explaining an operating method of a data storage device according to an embodiment.

Operations of the method of FIG. 6 already described with respect to the operating method of a data storage device of FIG. 6 are not described again here.

First, the controller 200 may receive a write request of data transmitted from a host device (S201).

The controller 200 may determine and manage interleavability of a write-requested logical address whenever the write-requested data is written in the nonvolatile memory device 100 (S203). The memory group may be a group of units to be interleavable at once and may include a plurality of planes or a plurality of blocks.

The controller 200 may determine whether or not a current physical address corresponding to the write-requested logical addresses is included in an optimal memory region for the write-requested data whenever writing or updating the write-requested data in the nonvolatile memory device 100 or performing garbage collection on data stored in the nonvolatile memory device 100.

The controller 200 may generate the interleavability of each of the plurality of memory regions by determining whether or not a current physical address corresponding to the write-requested logical address is included in the optimal memory region for the write-requested data.

As described with reference to Equation 1, the controller 200 may determine the optimal memory region for the logical address of the data write-requested from the host device using the logical address of the data write-requested from the host device, the number of logical addresses in one memory region applied in interleaving, and the number of memory regions in a memory group and determine the interleaving-aware dirty for each of the memory regions by determining the number of interleavable logical addresses in each of the memory regions based on whether the current physical address for the logical address of the write-requested data is included in the interleavable optimal memory region. The number of logical addresses in the one memory region applied in the interleaving may refer to the number of logical addresses corresponding to a data size stored in memory cells coupled to one word line in one memory region.

The controller 200 may determine whether or not a garbage collection condition is satisfied (S205). When the garbage collection condition is satisfied, the controller 200 may determine that a victim memory group for garbage collection needs to be selected.

The controller 200 may determine that the garbage collection condition is satisfied when the garbage collection command is received from the host device or the garbage collection command has not been received from the host device for the set time or more.

When it is determined that the garbage collection condition is satisfied, the controller 200 may select a victim memory group among the plurality of memory groups using the interleavability of the memory regions.

For example, the controller 200 may calculate an average interleavability of each of the plurality of memory groups and an average (see "x" of FIG. 5) interleavability of all memory groups (S207).

The controller 200 may compare the calculated average interleavability of all memory groups with a threshold value (S209).

When the calculated average interleavability of all memory groups is equal to or larger than the threshold value, the controller 200 may select the victim memory group among the memory groups based on the average interleavability of each of the plurality of memory groups (S211).

The controller 200 may select the memory group (e.g., Memory Group 1) having the smallest average of the interleavability of each of the plurality of memory groups, e.g., Memory Group 0 and Memory Group 1, as the victim memory group.

The controller 200 may perform garbage collection on the victim memory group (S213).

When it is determined that the calculated average interleavability of all memory groups is less than the threshold value in operation S209, the controller 200 may transmit a request for maintaining power for garbage collection to the host device (S215), and when acceptance of the request is received (S217), the controller 200 select the victim memory group (e.g., Memory Group 1) among the memory groups, e.g., Memory Group 0 and Memory Group 1, based on the average interleavability of each of the plurality of memory groups (S211). The controller 200 may select the memory group (e.g., Memory Group 1) having the smallest average interleavability of each of the plurality of memory groups, e.g., Memory Group 0 and Memory Group 1, as the victim memory group, but the invention is not limited thereto. The controller 200 may perform garbage collection on the victim memory group (S213).

The controller 200 may determine whether or not more time for the power for garbage collection still remains and, if so, whether the remaining amount of time is equal to or larger than a time required to perform additional garbage collection (S219).

When it is determined that the remaining amount of time is equal to or larger than the additional garbage collection performing time in operation S219, the controller 200 may repeatedly perform operations S211 to S219. The controller 200 may select another memory group, that is, a group other than the memory group on which the garbage collection was previously performed, among the memory groups as the victim memory group based on the average interleavability of each of the plurality of memory groups which was determined in selecting the previous victim memory group. The controller 200 may select, as the victim memory group, the memory group having the lowest interleavability, among the remaining memory groups based on the average interleavability of each of the plurality of memory groups which was determined in selecting the previous victim memory group.

Figure 8:
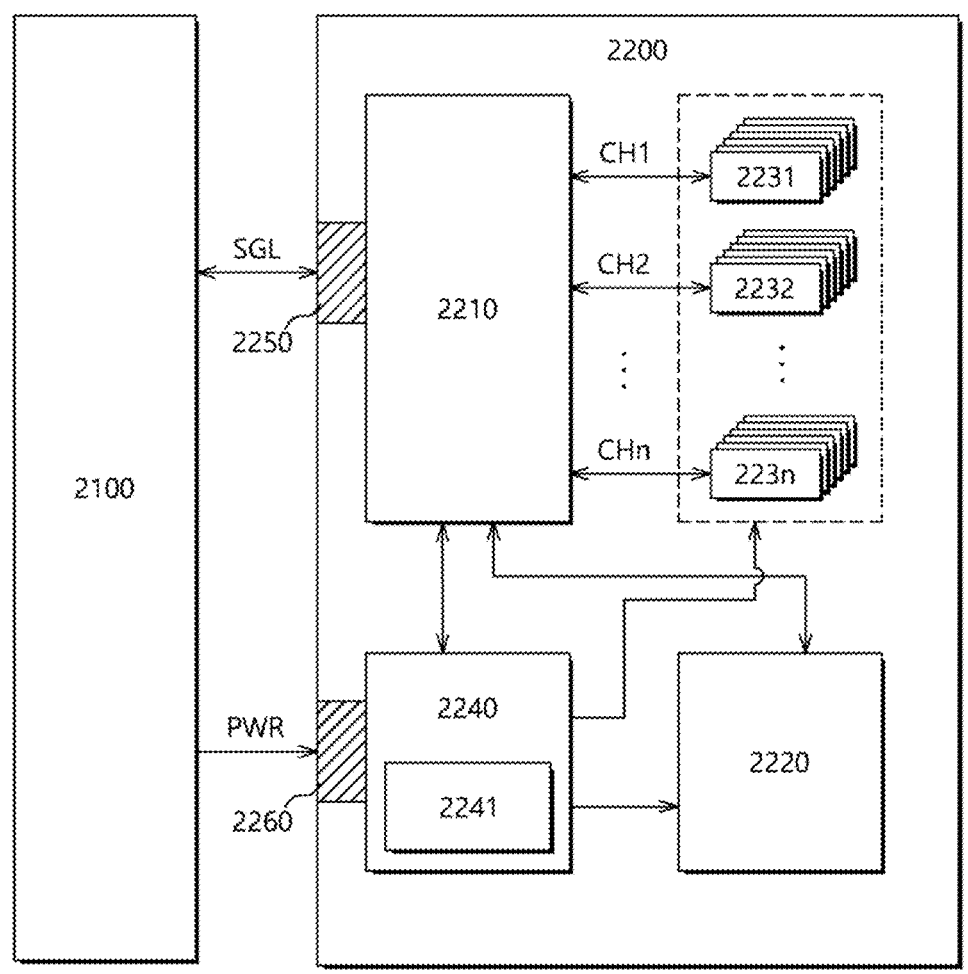
FIG. 8 is a diagram illustrating a data processing system including a solid state drive (SSD) according to an embodiment of the present disclosure.

FIG. 8 is a block diagram illustrating a data processing system including a solid state drive (SSD) according to an embodiment. Referring to FIG. 8, a data processing system 2000 may include a host device 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2200.

The buffer memory device 2220 may temporarily store data which are to be stored in the nonvolatile memory devices 2231 to 223n. Further, the buffer memory device 2220 may temporarily store data which are read out from the nonvolatile memory devices 2231 to 223n. The data temporarily stored in the buffer memory device 2220 may be transmitted to the host device 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to the same channel may be coupled to the same signal bus and data bus.

The power supply 2240 may provide power PWR inputted through the power connector 2260 to the inside of the SSD 2200. The power supply 2240 may include an auxiliary power supply 2241. The auxiliary power supply 2241 may supply power to allow the SSD 2200 to be properly terminated when sudden power-off (SPO) occurs. The auxiliary power supply 2241 may include large capacity capacitors capable of charging the power PWR.

The controller 2210 may exchange a signal SGL with the host device 2100 through the signal connector 2250. The signal SGL may include a command, an address, data, and the like. The signal connector 2250 may be configured as any of various types of connectors according to an interface scheme between the host device 2100 and the SSD 2200.

Figure 9:
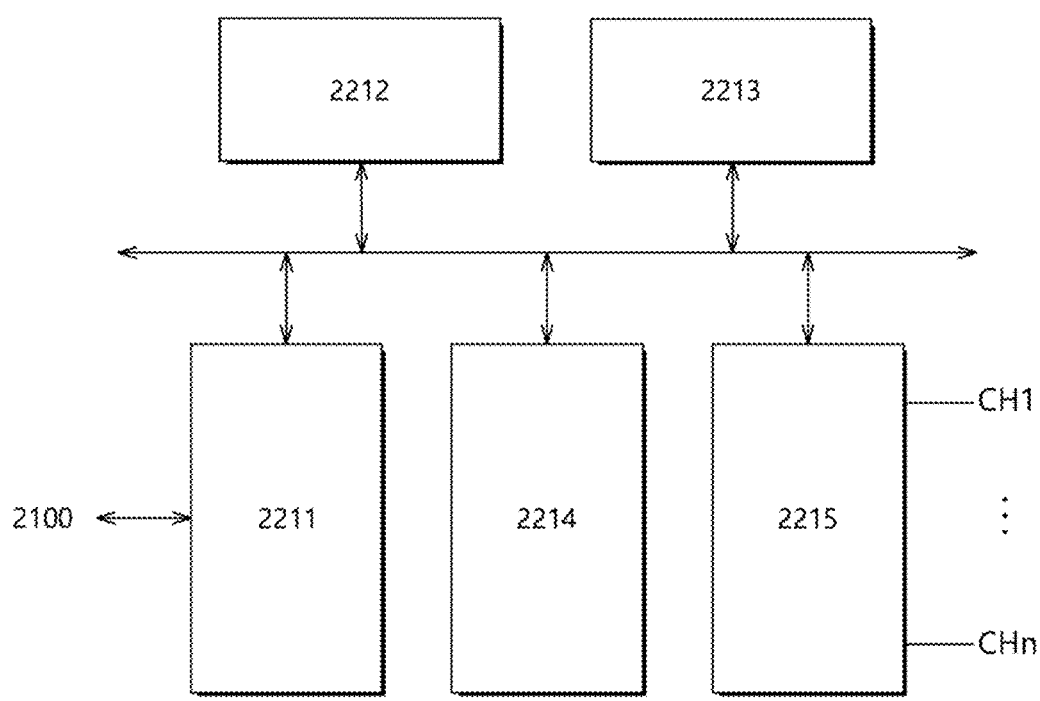
FIG. 9 is a diagram illustrating a configuration of a controller, such as that in FIG. 8.

FIG. 9 is a block diagram illustrating the controller illustrated in FIG. 8. Referring to FIG. 9, the controller 2210 may include a host interface 2211, a control component 2212, a random access memory 2213, an error correction code (ECC) component 2214, and a memory interface 2215.

The host interface 2211 may provide interfacing between the host device 2100 and the SSD 2200 according to a protocol of the host device 2100. For example, the host interface 2211 may communicate with the host device 2100 through any of SD, USB, MMC, embedded MMC (eMMC), PCMCIA, PATA, SATA, SCSI, SAS, PCI, PCI-E, and UFS protocols. In addition, the host interface 2211 may perform a disk emulating function of supporting the host device 2100 to recognize the SSD 2200 as a general-purpose data storage device, for example, a hard disk drive (HDD).

The control component 2212 may analyze and process the signal SGL inputted from the host device 2100. The control component 2212 may control operations of internal function blocks according to firmware or software for driving the SSD 2200. The random access memory 2213 may be used as a working memory for driving such firmware or software.

The ECC component 2214 may generate parity data of data to be transmitted to the nonvolatile memory devices 2231 to 223n. The generated parity data may be stored, along with the data, in the nonvolatile memory devices 2231 to 223n. The ECC component 2214 may detect errors of data read out from the nonvolatile memory devices 2231 to 223n based on the parity data. When the detected errors are within a correctable range, the ECC component 2214 may correct the detected errors.

The memory interface 2215 may provide control signals such as commands and addresses to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read out from the nonvolatile memory devices 2231 to 223n to the buffer memory device 2220.

Figure 10:
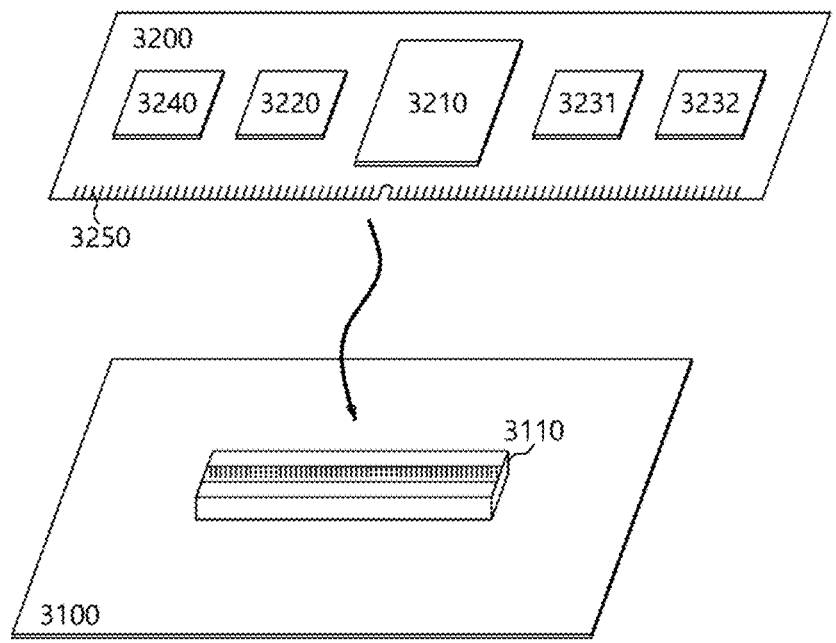
FIG. 10 is a diagram illustrating a data processing system including a data storage device according to an embodiment of the present disclosure.

FIG. 10 is a diagram illustrating a data processing system including a data storage device according to an embodiment. Referring to FIG. 10, a data processing system 3000 may include a host device 3100 and a data storage device 3200.

The host device 3100 may be configured in the form of a board such as a printed circuit board. Although not shown in FIG. 10, the host device 3100 may include internal function blocks for performing functions of the host device.

The host device 3100 may include a connection terminal 3110 such as a socket, a slot, or a connector. The data storage device 3200 may be mounted on the connection terminal 3110.

The data storage device 3200 may be configured in the form of a board such as a printed circuit board. The data storage device 3200 may refer to a memory module or a memory card. The data storage device 3200 may include a controller 3210, a buffer memory device 3220, nonvolatile memory devices 3231 and 3232, a power management integrated circuit (PMIC) 3240, and a connection terminal 3250.

The controller 3210 may control overall operation of the data storage device 3200. The controller 3210 may be configured in the same manner as the controller 2210 shown in FIG. 9.

The buffer memory device 3220 may temporarily store data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the data storage device 3200.

The PMIC 3240 may provide power inputted through the connection terminal 3250, to the inside of the data storage device 3200. The PMIC 3240 may manage the power of the data storage device 3200 according to control of the controller 3210.

The connection terminal 3250 may be coupled to the connection terminal 3110 of the host device 3100. Through the connection terminal 3250, signals such as commands, addresses, data and the like and power may be transferred between the host device 3100 and the data storage device 3200. The connection terminal 3250 may be configured as any of various types depending on an interface scheme between the host device 3100 and the data storage device 3200. The connection terminal 3250 may be disposed on or in any side of the data storage device 3200.

Figure 11:
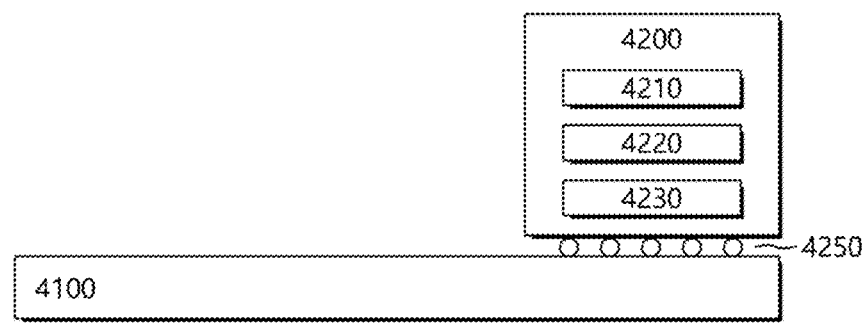
FIG. 11 is a diagram illustrating a data processing system including a data storage device according to an embodiment of the present disclosure.

FIG. 11 is a block diagram illustrating a data processing system including a data storage device according to an embodiment. Referring to FIG. 11, a data processing system 4000 may include a host device 4100 and a data storage device 4200.

The host device 4100 may be configured in the form of a board such as a printed circuit board. Although not shown in FIG. 11, the host device 4100 may include internal function blocks for performing functions of the host device.

The data storage device 4200 may be configured in the form of a surface-mounting type package. The data storage device 4200 may be mounted on the host device 4100 through solder balls 4250. The data storage device 4200 may include a controller 4210, a buffer memory device 4220, and a nonvolatile memory device 4230.

The controller 4210 may control overall operation of the data storage device 4200. The controller 4210 may be configured in the same manner as the controller 2210 shown in FIG. 9.

The buffer memory device 4220 may temporarily store data to be stored in the nonvolatile memory device 4230. Further, the buffer memory device 4220 may temporarily store data read out from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as a storage medium of the data storage device 4200.

Figure 12:
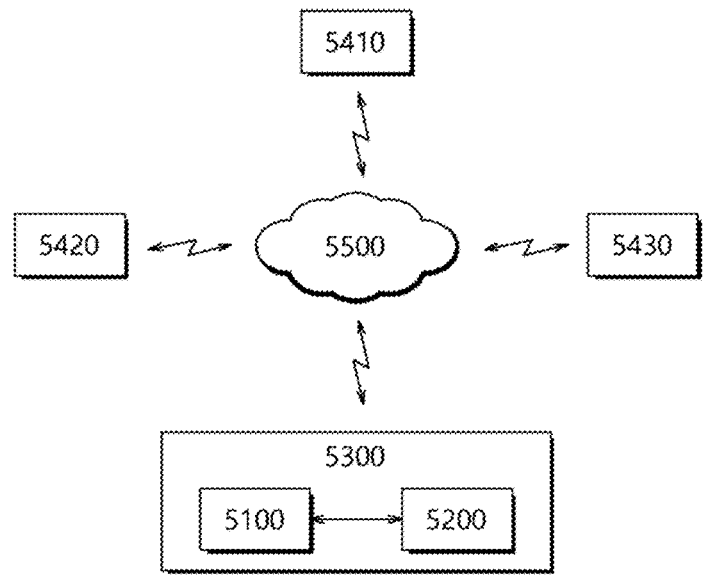
FIG. 12 is a diagram illustrating a network system including a data storage device according to an embodiment of the present disclosure.

FIG. 12 is a diagram illustrating a network system 5000 including a data storage device according to an embodiment. Referring to FIG. 12, the network system 5000 may include a server system 5300 and a plurality of client systems 5410 to 5430 which are coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host device 5100 and a data storage device 5200. The data storage device 5200 may be configured as the data storage device 10 illustrated in FIG. 1, the data storage device 2200 illustrated in FIG. 8, the data storage device 3200 illustrated in FIG. 10, or the data storage device 4200 illustrated in FIG. 11.

Figure 13:
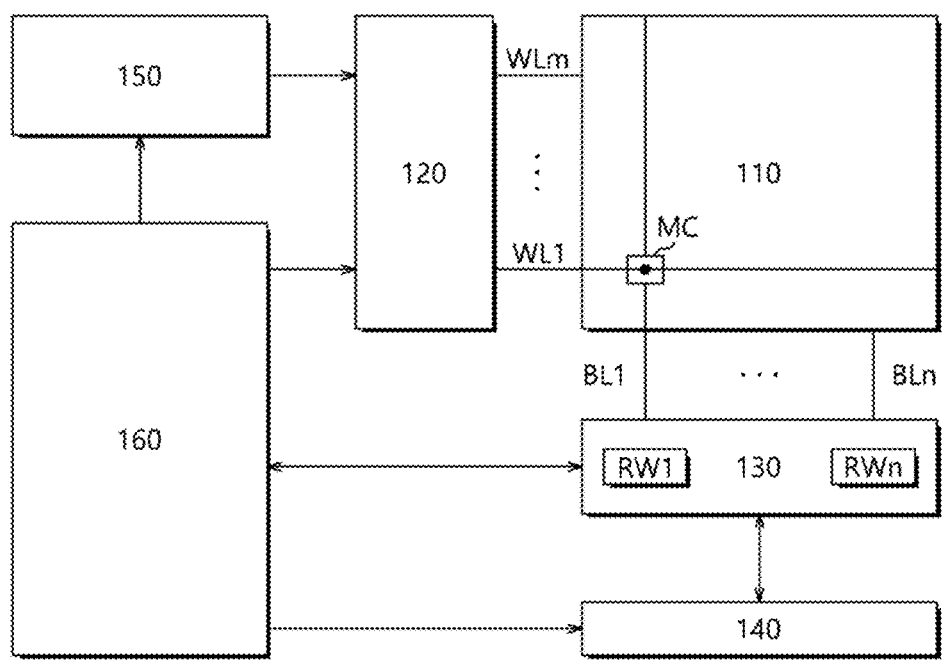
FIG. 13 is a diagram illustrating a nonvolatile memory device included in a data storage device according to an embodiment of the present disclosure.

FIG. 13 is a block diagram illustrating a nonvolatile memory device included in a data storage device according to an embodiment. Referring to FIG. 13, the nonvolatile memory device 100 may include the memory cell array 110, a row decoder 120, a data read/write block 130, a column decoder 140, a voltage generator 150, and control logic 160.

The memory cell array 110 may include the memory cells MC which are arranged in regions where the word lines WL1 to WLm and the bit lines BL1 to BLn cross each other.

The row decoder 120 may be coupled with the memory cell array 110 through the word lines WL1 to WLm. The row decoder 120 may operate according to control of the control logic 160. The row decoder 120 may decode addresses provided from an external device (not shown). The row decoder 120 may select and drive the word lines WL1 to WLm, based on the decoding results. For example, the row decoder 120 may provide word line voltages provided from the voltage generator 150, to the word lines WL1 to WLm.

The data read/write block 130 may be coupled with the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as a write driver which stores data provided from the external device, in the memory cell array 110 in a write operation. In another example, the data read/write block 130 may operate as a sense amplifier which reads out data from the memory cell array 110 in a read operation.

The column decoder 140 may operate according to control of the control logic 160. The column decoder 140 may decode addresses provided from the external device. The column decoder 140 may couple data input/output lines (or data input/output buffers) with the read/write circuits RW1 to RWn of the data read/write block 130 which respectively correspond to the bit lines BL1 to BLn, based on decoding results.

The voltage generator 150 may generate voltages to be used in internal operations of the nonvolatile memory device 100. The voltages generated by the voltage generator 150 may be applied to the memory cells MC of the memory cell array 110. For example, a program voltage generated in a program operation may be applied to a word line of memory cells on which the program operation is to be performed. In another example, an erase voltage generated in an erase operation may be applied to a well region of memory cells on which the erase operation is to be performed. In still another example, a read voltage generated in a read operation may be applied to a word line of memory cells on which the read operation is to be performed.

The control logic 160 may control overall operation of the nonvolatile memory device 100, based on control signals provided from the external device. For example, the control logic 160 may control operations of the nonvolatile memory device 100 such as read, write, and erase operations of the nonvolatile memory device 100.

The above described embodiments of the present invention are intended to illustrate, not limit the present invention. Various alternatives and equivalents are possible, as those skilled in the art will appreciate in light of the present disclosure. The invention is not limited by or to any of the embodiments described herein. Nor is the invention limited to any specific type of semiconductor device. Rather, the present invention encompasses all variations and modifications that fall within the scope of the appended claims.

What is claimed is:

1. A data storage device comprising:
   a nonvolatile memory device including a plurality of memory groups, each of which includes a plurality of memory regions in interleaving units; and
   a controller configured to:
   determine interleavability of a write-requested logical address of write-requested data by determining whether or not a physical address corresponding to the write-requested logical address is included in an optimal memory region whenever the write-requested data is written in the nonvolatile memory device, and manage the interleavability by counting a number of interleavable logical addresses that correspond to physical addresses included in the optimal memory region,
   select a victim memory group among the plurality of memory groups using the number of interleavable logical addresses, and
   perform garbage collection on the selected victim memory group,
   wherein the controller includes a processor configured to:
   generate and manage interleavability of each of the plurality of memory regions by counting the number of the interleavable logical addresses of each of the plurality of memory regions; and
   calculate an average interleavability of each of the plurality of memory groups and select the victim memory group among the memory groups based on the calculated average interleavabilities.

2. The data storage device of claim 1, wherein the logical address of the write-requested data is arranged in an interleavable memory region.

3. The data storage device of claim 2, wherein the controller further includes:
   a memory configured to store the interleavability of each of the plurality of memory regions,
   wherein the processor determines the optimal memory region for the logical address of the write-requested data using the logical address of the write-requested data, the number of logical addresses in one memory region applied in interleaving, and the number of memory regions in a memory group applied in the interleaving.

4. The data storage device of claim 3,
wherein the processor calculates the average interleavability of each of the plurality of memory groups and an average interleavability of all the memory groups, and
wherein the processor selects, as the victim memory group, a memory group having the lowest average interleavability of the plurality of memory groups when the calculated average interleavability of all the memory groups is equal to or larger than a threshold value.

5. The data storage device of claim 3,
wherein the processor calculates the average interleavability of each of the plurality of memory groups and an average interleavability of all the memory groups,
wherein the processor transmits a request for maintaining power for garbage collection to a host device when the calculated average interleavability of all the memory groups is less than a threshold value, and
wherein the processor select the victim memory group among the plurality of memory groups based on the average interleavabilities of the respective memory groups when acceptance of the request is received from the host device.

6. The data storage device of claim 3, wherein the processor selects the victim memory group when a garbage collection command is received from a host device or a duration in which the garbage collection command is not received from the host device is equal to or larger than a set time.

7. The data storage device of claim 3, wherein the processor determines whether or not the physical address corresponding to the write-requested logical address is included in the optimal memory region whenever writing or updating the write-requested data in the nonvolatile memory device or performing garbage collection on data stored in the nonvolatile memory device.

8. The data storage device of claim 3, wherein the physical address is matched with information for a memory group and a memory region, and other information including offset information.

9. The data storage device of claim 3, wherein the memory group is a target unit of a single interleaving operation and includes a plurality of planes or a plurality of blocks.

10. A data storage device comprising:
a nonvolatile memory device including a plurality of memory groups, each of which includes a plurality of memory regions in interleaving units; and
a controller configured to:
generate interleavability of each of the plurality of memory regions by determining whether or not a current physical address corresponding to the write-requested logical address is included in an optimal memory region whenever the write-requested data is written in the nonvolatile memory device, and manage the interleavability by counting a number of interleavable logical addresses that correspond to physical addresses included in the optimal memory region,
select a victim memory group among the plurality of memory groups based on the number of interleavable logical addresses, and
perform garbage collection on the selected victim memory group, wherein the controller determines the optimal memory region for the logical address using the logical address of the write-requested data, the number of logical addresses in one memory region applied in interleaving, and the number of memory regions in a memory group applied in the interleaving, and
wherein the controller calculates an average interleavability of each of the plurality of memory groups and selects the victim memory group among the memory groups based on the calculated average interleavabilities.

11. An operating method of a data storage device, the method comprising:
determining interleavability of a write-requested logical address of write-requested data by determining whether or not a physical address corresponding to the write-requested logical address is included in an optimal memory region whenever the write-requested data is written in a nonvolatile memory device, and manage the interleavability by counting a number of interleavable logical addresses that correspond to physical addresses included in the optimal memory region;
selecting a victim memory group among a plurality of memory groups, each of which includes a plurality of memory regions in interleaving units, using the number of interleavable logical addresses when a garbage collection condition is satisfied; and
performing garbage collection on the selected victim memory group,
wherein the selecting of the victim memory group among the plurality of memory groups includes:
calculating an average interleavability of each of the plurality of memory groups; and
selecting the victim memory group among the plurality of memory groups based on the calculated average interleavabilities.

12. The method of claim 11, wherein the determining of the interleavability includes generating interleavability of each of the plurality of memory regions by determining whether or not the physical address corresponding to the write-requested logical address is included in the optimal memory region whenever the write-requested data is written in the nonvolatile memory device.

13. The method of claim 12, wherein the determining of the interleavability includes:
determining the optimal memory region for the logical address of the write-requested data using the logical address of the write-requested data, the number of logical addresses in one memory region applied in interleaving, and the number of memory regions in a memory group applied in the interleaving; and
determining the interleavability of each of the plurality of memory regions by counting the number of the interleavable logical addresses of each of the plurality of memory regions.

14. The method of claim 11, wherein the selecting of the victim memory group among the plurality of memory groups further includes:
calculating an average interleavability of all the memory groups; and
selecting the victim memory group among the plurality of memory groups based on the average interleavabilities of the respective memory groups when the calculated average interleavability of all the memory groups is equal to or larger than a threshold value.

15. The method of claim 11, wherein the selecting of the victim memory group among the plurality of memory groups further includes:
- calculating an average of interleavability of all the memory groups;
- transmitting a request for maintaining power for garbage collection to a host device when the calculated average interleavability of all the memory groups is less than a threshold value; and
- selecting the victim memory group among the plurality of memory groups based on the average interleavabilities of the respective memory groups when acceptance of the request is received from the host device.

16. The method of claim 11, wherein it is determined that the garbage collection condition is satisfied when a garbage collection command is received from a host device or a duration in which the garbage collection command is not received from the host device is equal to or larger than a set time.

17. The method of claim 11, wherein the determining of the interleavability includes determining whether or not the physical address corresponding to the write-requested logical address is included in the optimal memory region whenever writing or updating the write-requested data in the nonvolatile memory device or performing garbage collection on data stored in the nonvolatile memory device.

18. The method of claim 11, wherein the memory group is a target unit of a single interleaving operation and includes a plurality of planes or a plurality of blocks.

* * * * *